June 1, 1965  D. L. PREVITE  3,186,580

CLOSURE DEVICE

Filed Feb. 7, 1962

INVENTOR.
DOMINICK L. PREVITE
BY
ATTORNEY 3,186,580
CLOSURE DEVICE
Dominick L. Previte, Willowick, Ohio, assignor to Eaton Manufacturing Company, Cleveland, Ohio, a corporation of Ohio
Filed Feb. 7, 1962, Ser. No. 171,720
2 Claims. (Cl. 220—44)

Broadly, this invention relates to pressure relief radiator caps but more specifically pertains to a pressure relief cap having a locking safety feature thereon.

The specific type of safety cap referred to herein is the type of closure device which is applied to containers where a fluid under pressure if suddenly released, could result in injury to the operator. To date, various types of safety pressure relief caps have been devised and presented for consumer use but as of yet, a simple and effective locking feature has not been presented on the market. There are many closure devices having locking means for preventing their removal but most of these structures comprise multiple part arrangements resulting in complex assemblies without insuring that the closure will be locked in position when applied to the container.

A typical situation where it is important to provide a locking means is in a radiator cap application for a pressurized water-cooled engine cooling system. For example, in a system designed to provide a pressurization of 15 p.s.i., sudden release of the pressurized fluid presents a dangerous condition to the person removing the cap. Hence, upon removal of the cap pressurized steam in the system will be relieved through the opening in the radiator filler neck whereby serious injury to the operator could readily occur. Accordingly, a pressure relieving device having a fool-proof locking means thereon would force the operator to relieve the pressure of the coolant before removing the cap. Therefore, it is the principal object of this invention to provide a pressure cap which has a locking means thereon operable to prevent the removal of the cap before relieving any pressure condition existing in the system to which the cap is applied.

It is another object of this invention to provide a pressure relief cap wherein release of the locking means actuates means which relieves any pressure condition developed in a container.

It is still another object of this invention to provide a safety pressure relief cap wherein the safety feature comprises a lever arm having a locking means cooperable with a portion of the filler neck and means connected with the lever arm operable to release any pressure contained by the cap.

It is a further object of this invention to provide a safety pressure relief cap having a safety locking feature which is simple in design and economical in its production.

These and other objects will become readily apparent from the following description taken in connection with the accompanying drawing wherein.

Figure 1:
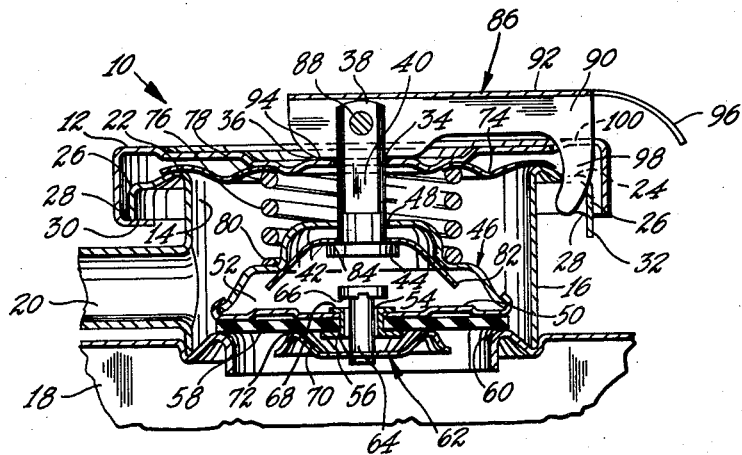
FIGURE 1 is a cross-sectional view of the safety pressure relief cap in a closed position on the filler neck portion of a container.

Referring directly to FIGURE 1 of the drawing, the pressure relief cap 10 comprises a cover shell 12 adapted to be receivable over an opening 14 formed by a filler neck 16 extending from a container tank 18 partially shown. An overflow pipe 20 is connected to the filler neck and functions as a bypass for fluid flowing from the container into the neck 16. The filler neck 16 has a seat portion 22 having a pair of openings 24 therein (one shown) and a rim portion 26 having a pair of cammed edges 28 thereon engageable with corresponding flanges 30 extending from the cover shell. Only one cam and flange arrangement is shown and will be referred to solely herein for the purpose of brevity. The flange 30 and cam edge 28 upon engagement, function to orientate the closure device onto the filler neck upon rotation of the cap with respect thereto. A pair of conventional stops 32 (one shown) are located on the rim 26 against which the flanges 30 of the cover shell 12 abut. The stops prevent further rotation of the cover shell about the neck portion 16 of the radiator tank.

A rectangular opening 34 is centrally disposed in a recessed portion 36 in the cover shell adaptable to receive a pin 38 therethrough, with the pin having lands 40 thereon cooperable with the opening 34 restricting rotation of the pin with respect to the cover shell in a keying arrangement. One end 42 of the pin 38 has a shoulder 44 thereon operable to restrict axial movement of a bell-shaped housing assembly 46 which is adaptable to be received thereon. The bell-shaped housing assembly functions as a valve for restricting fluid flow from the container and has a central opening 48 in which the pin is reciprocably receivable. The bell-shaped housing has a bottom plate 50 secured thereto forming a chamber 52 within the housing. An opening 54 is centrally disposed in the bottom plate 50 thereof and has a ferrule 56 secured to the plate adaptable to hold a sealing pad 58 adjacent the bottom surface thereof. The sealing pad 58 is engageable with a seat or shoulder 60 in the filler neck 16 and functions to seal the fluid within the container from the surrounding atmosphere preventing communication of the fluid in the chamber with the overflow pipe and the filler neck.

Disposed in the opening 54 in the bottom plate 50 and ferrule 56 is a reciprocable vacuum relief valve assembly 62 comprising a pin or rivet 64 axially movable in the opening in the ferrule and having a shoulder 66 formed thereon radially extending a distance substantially greater than the opening of the ferrule and engageable with a flange 68 formed thereon effective to restrict the axial movement of the rivet in the opening 54. An annular plate 70 is secured to the rivet 64 and is engageable with the sealing pad by a ridge 72 formed by the plate 70 configuration and a seal is effected therebetween responsive to fluid pressure in the container acting on the plate. This vacuum relief valve assembly operation will be described in detail later in the specification.

A flexible diaphragm member 74 is disposed axially adjacent the cover shell 12 and is radially dimensioned so that it is receivable on the seat 22 of the filler neck 16 in sealing engagement therewith. Axially disposed intermediate the bell-shaped housing and the diaphragm is a coil spring 76 having one end 78 thereof engageable with the diaphragm and the other end 80 thereof engageable with the bell-shaped housing assembly. The coil spring is effective to bias the bell-shaped housing along the axial length of the pin 38 and maintain the housing in engagement with the shoulder formed on one end of the pin. Similarly, the end 78 of the spring maintains the diaphragm adjacent the lower surface of the recessed portion of the cover shell.

A leaf spring 82 is disposed in the chamber 52 formed in the bell-shaped housing and has a central opening 84 therein in which the pin is receivable. The leaf spring 82 is disposed intermediate the shoulder 44 of the pin and the bell-shaped housing. Upon securement of the cap to the filler neck and the compression of the spring 76 thereby when the sealing pad is in engagement with the shoulder of the filler neck, the leaf spring 82 functions to prevent any vibration of the pin in the chamber since the spring will resiliently react against the bell-shaped housing and maintain the pin in a substantially axially aligned position.

A lever arm 86 is formed in a substantially channel-shaped configuration and is pivotally secured to one end of the pin 38 by a dowel 88. The arm 86 comprises a pair of wall portions 90 extending from a base portion 92. These wall portions have edges 94 thereon forming a cam surface and are engageable with the recessed portion of the cover shell. The wall portions 90 function to slightly compress the coil spring 76 reacting against the cover shell 12 and maintain the members of the assembly in a cooperable relation with one another effecting the resilient bias arrangement between the bell-shaped housing assembly 46 and the diaphragm 74 and cover shell 12. One end of the lever arm has a flange 96 extending from the base portion 92 thereof, which can be engaged by the operator to pivot the arm about the pin 38.

In the use of the cap for a pressure relief closure device on a radiator, for example, the flange 96 having a curved configuration extends beyond the diameter of the cover member and accordingly serves a dual function; first, as a handle, the flange can be readily grasped by the operator intending to remove the cap from the radiator; second, the flange enables the lever arm to be placed in locking position by the hood of the vehicle in the event the operator fails to pivot the arm into closed or locking position.

The lever arm is assembled in a manner whereby pivotal movement about the pin is limited to an acute angle with respect to the cover member of the cap. By providing this limitation a movement will be created about the pin wherein the lever arm can readily be positioned by the vehicle hood, in locking engagement with the filler neck, irrespective of the positioning of the cap on the filler neck or the position the lever arm is left when out of locking engagement. A locking tab 98 extends from one wall portion of the lever arm and is receivable in an opening 100 formed in the cover shell and into one of the openings 24 formed in the rim 26 of the filler neck. In operation, accurate movement of the lever arm engages the edge 94 of the walls 90 with the recessed portion 36 of the cover shell in a camming action and axially moves the pin disposed in the opening of the shell so as to unseat the bell-shaped housing and sealing pad from the shoulder 60 formed in the filler neck. This movement of the arm is the pressure relief function of the cap assembly allowing pressure within the container to escape into the filler neck and out into the surrounding atmosphere.

In the event the pressure of the coolant in the container falls below atmospheric, the vacuum release valve assembly functions to relieve this condition by reciprocating in the ferrule opening. The plate 70 is no longer held in sealing engagement with the pad 58 due to the absence of pressure in the container and the partial vacuum causes the shoulder 66 of the rivet 64 to engage the flange 68 of the ferrule. Thus air enters into the closure assembly from the overflow pipe through the pin and bell-shaped housing arrangement, the chamber 52 and between the shoulder 66 of the rivet and the ferrule flange 68 into the container 18.

When placing the closure device over the filler neck, the following sequence occurs. The pin and bell-shaped housing assembly are inserted into the filler neck whereby the sealing pad engages the internal shoulder formed by the filler neck and the container. The operator positions the cover shell in engagement with the rim of the neck portion thereby compressing the coil spring and accordingly effects the sealing engagement between the pad and the shoulder of the container. The flange 30 on the cover shell engages the cam surface 28 located on the rim of the filler neck and upon continued rotation of the cover shell, the flange 30 engages the stop portion 32 formed on the cam surface. The pin will remain relatively fixed with respect to the cover shell, due to the keying arrangement. At such time when the cover shell flange engages the stop, the cap is properly disposed on the filler neck. The lever arm is next pivoted about until it is parallel with the cover shell thereby disposing the locking tab 98 in the opening 100 in the shell and the axially aligned opening 24 in the filler neck. Thus, the tab prevents any further rotation of the cover shell with respect to the filler neck.

Figure 2:
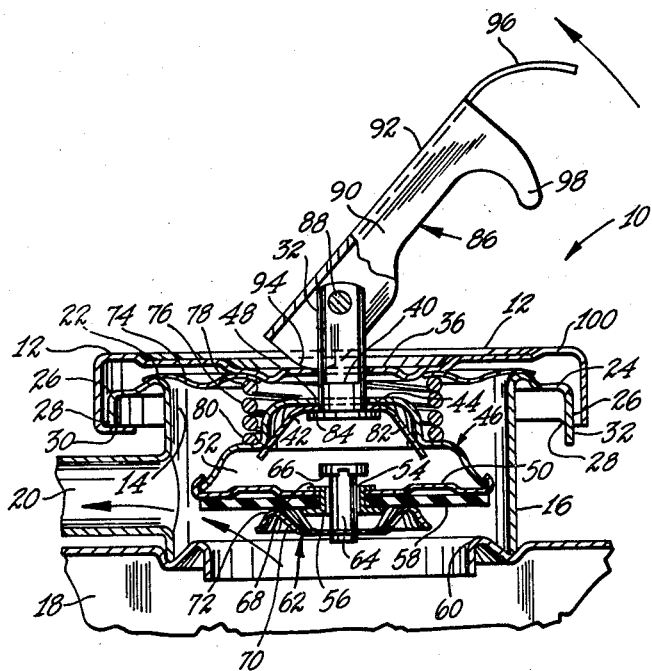
FIGURE 2 is a cross-sectional view of the cap is the pressure relief position illustrating the locking means thereon.

When it is desirable to remove the cap from the filler neck, the operator upon attempting to rotate the cover shell with respect to the filler neck, is prevented from doing so by the locking engagement of the tab extending from the lever arm into opening 24 formed in the filler neck. Therefore, it is necessary that the operator remove the tab from the opening by pivoting the lever about the pin and providing the camming engagement of the edge of the lever arm with the recessed portion 36 of the cover shell (FIG. 2). The edge reacting against the cover shell recess upon continued movement of the lever arm, effects an axial movement in the pin 38 in an outward direction lifting the bell-shaped housing and accordingly, the sealing pad 58 off the seat 60 in the filler neck portion. This movement of the lever arm causes the pin to break the seal between the pad 58 and the shoulder 60 allowing the fluid under pressure to escape from the container up into the neck and out through the overflow pipe 20. The operator upon noticing the escape of the steam or high pressure fluid will not attempt to remove the cap until such time that the release or elimination of the pressure has been entirely completed. At such time when the pressure has been relieved, it is safe for the operator to rotate the cap off the cam surface on the filler neck and accordingly, remove the cap assembly therefrom.

By the nature of the arrangement of the parts, facility in aligning the opening formed in the cover shell with the openings formed in the filler neck is readily obtained. Similarly, pivoting the lever arm and positioning the tab into these openings is accomplished by a simple manual operation. These openings are alignable merely by placing the closure on the filler neck and rotating the cover shell until the flange thereof engages the stop formed on the filler neck rim. The provision of the double opening 24 in the filler neck obviates the problem of reversal of the cap upon repositioning same on the filler neck.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited therefore, only by the appended claims.

I claim:
1. A pressure outlet pipe having an open end, a seat portion flaring outwardly from said open end, having an aperture disposed therein, a rim portion adjacent said seat portion having cam means disposed thereon in combination with a pressure relief closure device, said closure device comprising:
    a cover member engageable with and adapted to cover said open end of said pressure outlet pipe, said cover member having a peripheral slot adapted to register with said seat portion aperture;
    flange means depending from said cover member adapted to releasably engage said cam means disposed on said rim portion;
    a valve plate adjacent said cover member receivable in and engageable with said pressure outlet pipe;
    spring means disposed intermediate said valve plate and said cover member, so constructed and arranged to bias said valve plate from said cover member to effect a sealing engagement between said valve plate and said pressure outlet pipe;
    a movable pin member extending through said cover member being connected to said valve plate;
    said movable pin member having land means integral therewith;

said cover member having an opening therethrough, so constructed and arranged to slidably receive said movable pin member with said land means;

a lever member pivotally connected to said movable pin member and having a cam surface disposed adjacent said movable pin member and engageable with said cover member, whereby pivotal movement of said lever member selectively releases said valve plate from sealing engagement with said pressure outlet pipe;

said lever member having one end portion remote from said cam surface and a tab member projecting from said lever member;

said movable pin member with said land means having a portion, the configuration of which is substantially similar to the configuration of said opening through said cover member, whereby the cooperating relationship between said portion and said complementary opening through said cover member will effect a positive alignment of said peripheral slot with said tab member and rotatably fix said movable pin member and said lever member relative to said cover member;

stop means disposed adjacent said pressure outlet pipe open end, so constructed and arranged to cooperate with said flange means, whereby said peripheral slot on said cover member is brought into registry with said aperture on said seat portion; and said tab member of said lever member is receivable into said peripheral slot of said cover member and said aperture of said seat portion, said peripheral slot and said aperture being brought into axial alignment upon complete closure of said relief closure device on said pressure outlet pipe and cooperable with said tab member to effectively lock said cover member against rotation on said pressure outlet pipe.

2. A pressure relief closure device according to claim 1 in which said land means comprises at least one land element extending over a major portion of said movable pin member.

References Cited by the Examiner
UNITED STATES PATENTS

| | | | |
|---|---|---|---|
| 2,968,421 | 1/61 | Eshbaugh | 220—44 |
| 2,990,971 | 7/61 | Enell | 220—44 |
| 3,062,400 | 11/62 | Humbert | 220—44 |
| 3,098,636 | 7/63 | Contella | 220—44 |
| 3,102,660 | 9/63 | Bowden | 220—44 |

THERON E. CONDON, *Primary Examiner.*

EARLE J. DRUMMOND, GEORGE O. RALSTON,
*Examiners.*